United States Patent [19]
Assmann et al.

[11] Patent Number: 4,795,341
[45] Date of Patent: Jan. 3, 1989

[54] METHOD AND TUNNEL FURNACE FOR SINTERING BLANKS

[75] Inventors: Helmut Assmann, Dormitz; Wolfgang Dörr; Georg Maier, both of Herzogenaurach; Martin Peehs, Bubenreuth, all of Fed. Rep. of Germany

[73] Assignee: Kraftwerk Union Aktiengesellschaft, Mülheim, Fed. Rep. of Germany

[21] Appl. No.: 3,574

[22] Filed: Jan. 15, 1987

Related U.S. Application Data

[62] Division of Ser. No. 592,869, Mar. 23, 1984, Pat. No. 4,655,978.

[30] Foreign Application Priority Data

Mar. 24, 1983 [DE] Fed. Rep. of Germany ....... 3310789

[51] Int. Cl.$^4$ ................................................ F27D 3/04
[52] U.S. Cl. ..................................... 432/126; 432/143; 432/153

[58] Field of Search ................. 432/56, 126, 143, 153, 432/206, 246; 264/0.5

[56] References Cited

U.S. PATENT DOCUMENTS

| | | | |
|---|---|---|---|
| 3,837,794 | 9/1974 | Phillips | 432/143 X |
| 4,083,119 | 4/1978 | Yacura | 432/246 X |
| 4,125,365 | 11/1978 | Nelson | 432/153 X |
| 4,655,978 | 4/1987 | Assmann et al. | 432/126 X |

FOREIGN PATENT DOCUMENTS

818511 10/1951 Fed. Rep. of Germany ...... 432/126

*Primary Examiner*—Steven E. Warner
*Attorney, Agent, or Firm*—Herbert L. Lerner; Laurence A. Greenberg

[57] ABSTRACT

Method for sintering blanks into fuel pellets, in which the blanks are moved through the muffle of a tunnel furnace by pushing the blanks through the muffle on a guiding device which goes through the muffle and protrudes therefrom at least on the input side, in the form of a single-layer column of abutting blanks.

7 Claims, 4 Drawing Sheets

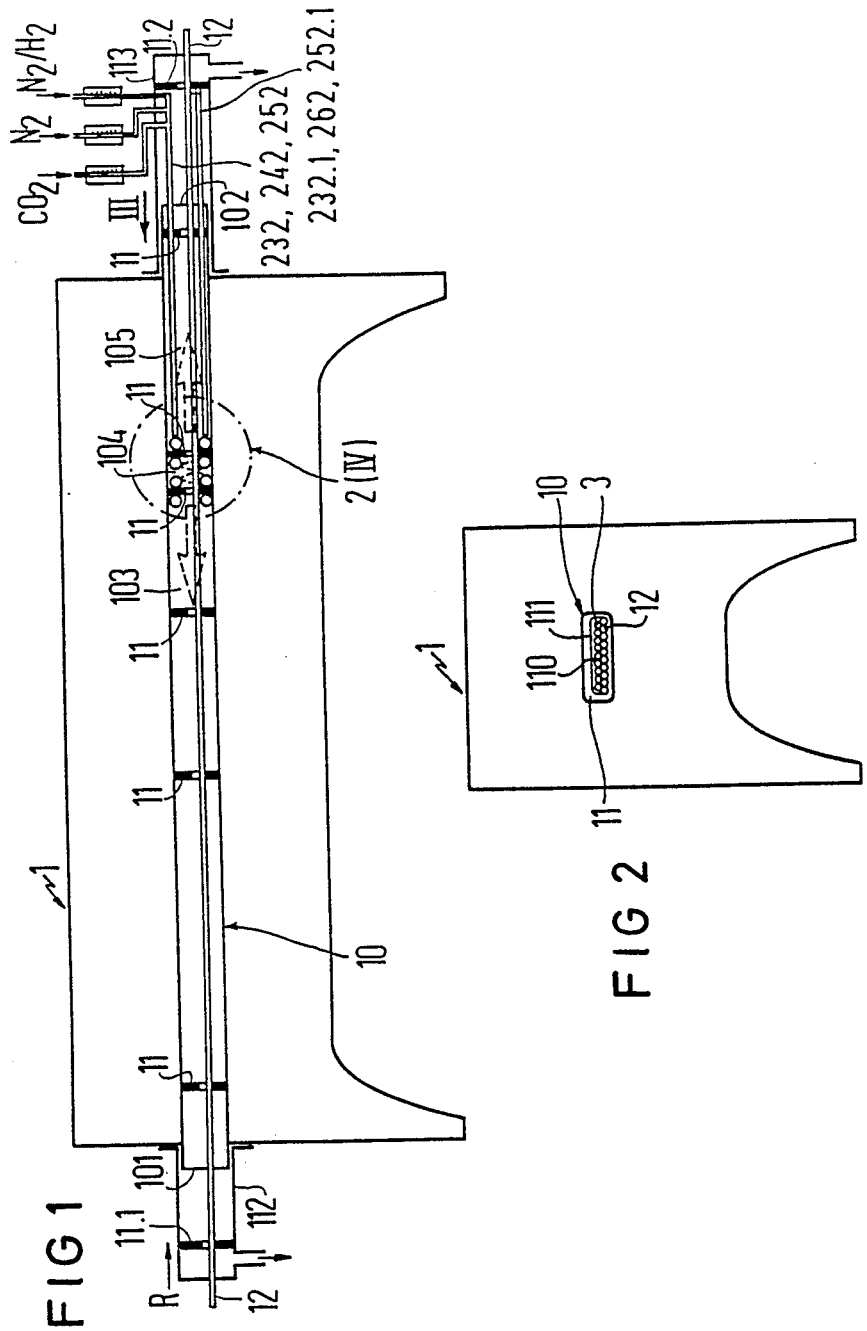

METHOD AND TUNNEL FURNACE FOR SINTERING BLANKS

This is a division of application Ser. No. 592,869, filed Mar. 23, 1984 now U.S. Pat. No. 4,655,978.

BACKGROUND OF THE INVENTION

1. Field of the Invention

The invention relates to a method for sintering oxidic nuclear fuel blanks into oxidic nuclear fuel pellets, in which the blanks are moved through the muffle of a tunnel furnace.

2. Description of the Prior Art

Transport boats have been used heretofore, on which a large number of blanks were stacked side by side and on top of each other, for transporting the blanks through the muffle of the tunnel furnace. Because of this stacking of the blanks, the temperature and the action of gases in the furnace are of necessity not identical for each blank, with the result that the deviation of the characteristics from the standard particularly of the dimensions and the density, of the sintered fuel pellets is quite large such that the pellets must be measured after the sintering and in part reworked by grinding.

The known method employing transport boats further requires a large cross section of the muffle, which means a correspondingly large material and power requirement; the latter is additionally increased because the transport boats must also be heated.

A further disadvantage of the known method involves the necessity of changing the process parameters, especially the residence time of the blanks, the temperature profile and the partial oxygen pressure to obtain pellet products of desired characteristics. This can be determined only after a transport boat has been unloaded and the fuel pellets have been measured; in the meantime, however, the incorrectly adjusted process continues to run and produce rejects.

Also, the latitude for process parameters is small with the known method since it is limited by the material properties of the transport boats which are subjected to the same process parameters as the blanks.

Thus, for instance, the temperature in the low-temperature short-time sintering process disclosed in German DE-C No. 28 55 166 and corresponding to U.S. Pat. No. 4,348,339, had to be limited because of its effect on the material for the transport boats in an oxidizing and reducing atmosphere.

Also, in oxidatively reducing sintering according to German DE-C No. 29 39 415, corresponding to allowed U.S. application Ser. No. 190,981 filed Sept. 26, 1980, the transport boats would have to withstand temperatures up to 1550° C. with different oxygen activities with a reduction in economy as a result thereof in large scale operation.

SUMMARY OF THE INVENTION

It is therefore an object of the invention to provide a method and a tunnel furnace for sintering blanks in which the listed disadvantages do not appear; in particular, the deviation of the characteristics of the sintered fuel pellets from the standard as well as the material and power requirements are reduced substantially. Means for optimizing the process parameters are provided.

With the foregoing and other objects in view, there is provided in accordance with the invention a method for sintering oxidic nuclear fuel blanks into oxidic nuclear fuel pellets in which the blanks are moved through a muffle of a tunnel furnace wherein the blanks are sintered, the improvement comprising pushing the blanks in the form of a single layer column of abutting blanks through the muffle on a guiding device which goes through the muffle and protrudes therefrom at least on the input side.

In accordance with the invention there is provided a tunnel furnace with a muffle for sintering oxidic fuel blanks into oxidic nuclear fuel pellets in which the blanks in the form of a single layer column of abutting blanks are pushed through the muffle, a guiding device for the column of blanks which goes through the muffle and protrudes therefrom at least on the input side; two partitions with one passage opening each are arranged in the muffle at a distance from each other; said guiding device composed of prismatic support rods which are placed parallel and side by side on the lower edge of the passage opening of the partitions, said guiding device going through the muffle having n+1 prismatic support rods for n columns of blanks; and wherein the dimensions of the passage openings are designed such that the smallest distance between a blank supported between two support rods and adjacent edges of the passage opening is smaller than one- to two-times the diameter of the blank.

Other features which are considered as characteristic for the invention are set forth in the appended claims.

Although the invention is illustrated and described herein as embodied in a method and tunnel furnace for sintering blanks, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 is a schematic section through a sintering furnace, heating devices having been omitted, FIG. 2 is a view of the sintering furnace in the direction of the arrow R in FIG. 1, the terminating piece having been omitted.

DETAILED DESCRIPTION OF THE INVENTION

Figure 3:
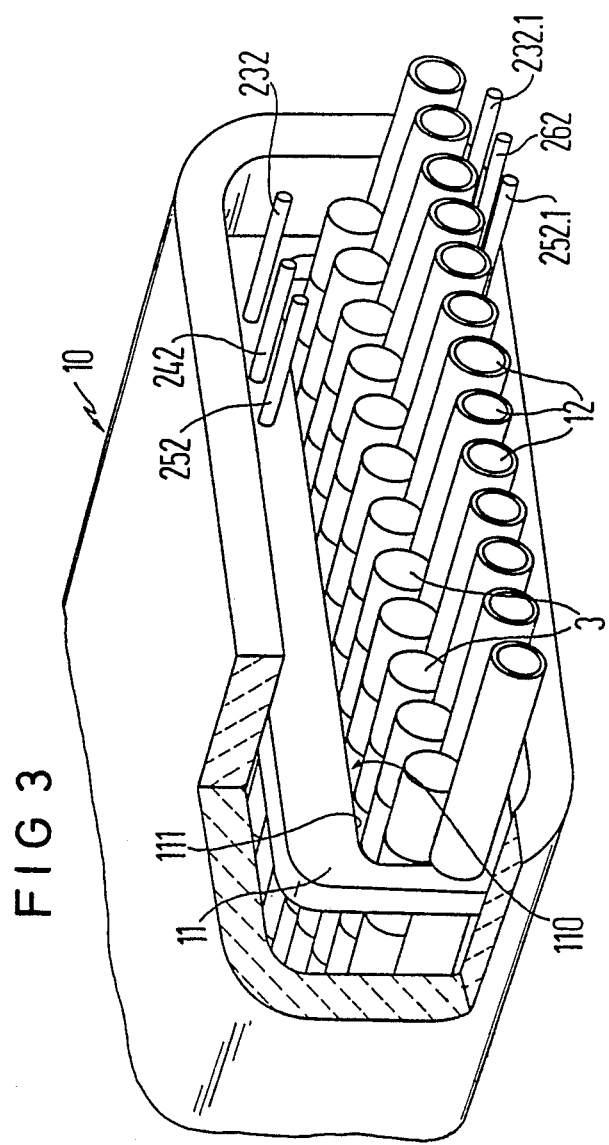
FIG. 3 is an enlarged perspective view of the muffle in the direction of the arrow III in FIG. 1, without the terminating piece.

According to the invention, the solution of overcoming or at least minimizing this problem of listed disadvantages is characterized in a method of the type mentioned at the outset by pushing the blanks through the muffle on a guiding device in the form of a single-layer column of abutting blanks which goes through the muffle and protrudes therefrom at least on the input side.

The invention therefore, works without transport boats. As a result, each individual blank traverses, under conditions of constant process parameters, the same temperature profile and the same atmosphere. As a consequence, deviation of the characteristics of the fuel pellets from the standard is more than halved as compared to the method used to date.

In conjunction with the continuous passage of the blanks, the process parameters can be controlled to produce the fully sintered fuel pellets with characteristics which lie in a narrow desired-value range such that the pellets can be processed further without rework, i.e., in particular, without grinding. To this end, the length of the blanks is preferably determined at a sufficient distance ahead of the exit opening of the muffle, for instance, by an optical method known per se. Dependent on the length as determined by the optical method, one of the process parameters (running speed, temperature profile, partial oxygen pressure, etc.) is change. The extent of this change is governed by an empirically determined characteristic which gives the value of the process parameter for each length. Such a curve is, of course, valid only for blanks with the same input characteristics (composition, density, dimensions).

Since the invention works without transport boats, not only is the cost of expensive material otherwise required therefor eliminated, but also eliminated is the loading and unloading of the boats as well as heating and cooling them.

The elimination of the transport boats and the single-layer arrangement of the blanks permits the use of a muffle with a substantially smaller overall height, which means correspondingly lower material and power costs. As a result of the small height of the muffle, the clear cross section between the individual blanks and the confining walls of the muffle is small, which lends itself to accurate adjustment of the gas atmosphere in the muffle and maintaining the gas atmosphere constant. Control of the gas atmosphere in the muffle can be accomplished sectionwise. To this end, at least part of the support rods which support the blanks in the muffle are designed as hollow support tubes have a passage opening at different points along their length. In this manner the gas composition can be measured at different points in the muffle and/or be changed by injecting a gas in the muffle through these spaced openings in the hollow support tubes. Furthermore, temperature sensors can be arranged movably in the support tubes to measure in a simple manner a temperature profile in the muffle.

The invention is particularly well suited for low-temperature short-time sintering according to DE-C No. 28 55 166 (U.S. Pat. No. 4,348,339), and the method in accordance with the present invention operates effectively and efficiently with a sintering temperature of 1300° C. The invention employs a particularly simple and effective design of a gas lock for separating the sintering zone from the reducing zone. Conventionally, blanks of oxidic nuclear fuel bodies are subjected in a muffle furnace to sintering in a sintering zone in an oxidizing atmosphere and to reduction in a reducing zone in a reducing atmosphere as more fully described for example in U.S. Pat. No. 4,348,339 and allowed U.S. application Ser. No. 190,981, filed Sept. 26, 1980. The optimum length ratio of these zones relative to each other for a given length of the muffle can be adjusted simply by moving the gas lock.

Thus, heretofore the blanks were sintered by loading them on transport boats and running them through the tunnel furnace. Each transport boat had a large number of blanks stacked side by side and on top of each other. This, of necessity, resulted in the characteristics, particularly the dimensions and the density of the finished fuel pellets having a relatively large spread since the temperature at and the gas access to each individual blank are different, even if only slightly. The large muffle cross section required here futher necessitates large expenditures for material and energy. By virtue of the present invention, this expenditure is substantially reduced. Of even greater significance, the deviation of the characteristics of the fuel pellets is reduced substantially from the standard, i. e. the usual number of percent of pellets which deviate sufficiently to require reworking. In order to achieve this, the blanks are pushed through the muffle on guide rods in the form of single-layer columns of abutting blanks. For this purpose, the muffle has only a very small overall height. The invention makes possible control of the process parameters such that the characteristics of the finished fuel pellets lie in so narrow a reference range that the fuel pellets can be used further without rework (grinding).

An embodiment example of the invention will be explained in greater detail, making reference to the drawings.

Muffle 10 of $Al_2O_3$ of substantially rectangular cross section goes through the tunnel furnace and protrudes from the tunnel furnace on both sides. The protruding parts of the muffle 10 are covered by two terminating pieces 112 and 113. Spaced partitions 11 of temperature-resistant material ($Al_2O_3$) are disposed in the muffle 10 within the tunnel furnace, and partitions 11.1 and 11.2 are disposed in the corresponding terminating pieces 112 and 113. These partitions have an approximately rectangular passage opening 110 (FIGS. 3, 4), on the lower edge of which straight support tubes 12 of $Al_2O_3$ are placed on side by side and parallel. Straight support tubes 12 protrude from both ends of the muffle 10 and its terminating sections 112 and 113, thereby facilitating making connections to charging or cooling devices.

Between every two support tubes 12, a single-layer column of abutting blanks 3 is placed. These columns are continuously pushed through the muffle simultaneously in the direction of the arrow R in FIG. 1 by a charging device 4.

The charging device 4 includes a flat plate 41 which, on its plane top side, has parallel grooves 411 for taking the columns of abutting blanks 3. On plate 41, the columns are spaced at the same distance from one another as on the straight support tubes 12 in muffle 10. The top side of plate 41 is arranged parallel to the longitudinal axes of the support tubes 12 and at a height placing blanks 3 on plate 41 and in muffle 10 at the same level.

A pushing rake 42 guided in two slots 421 and 422 parallel to the grooves 411 is provided with one tooth 423 for each groove 411. An endless drive chain 424 operated by an electric motor 428 via a cogwheel 425, a coupling 426 and a gear 427 moves the pushing rake 42 in the guide slots 421 and 422 in the direction of muffle 10.

Because of the smooth surfaces of the blanks and the support rails, the pressure necessary for each column is rather small, e.g. 1.5 kg in a furnace 3 m long. In furnaces of greater length, the required pressure can be reduced by an appropriate inclination of the muffle and the support rails.

In any case, the pressure applied to move the blanks through the muffle can be kept sufficiently low that the blanks which touch each other at the end faces only in a circular area neither bake together nor crumble.

The passage opening 110 (FIGS. 3, 4) in the partitions 11 is shaped and designed so that the smallest distance between a blank placed on the support rods and the respective adjacent edges 111 of the passage opening is smaller than one- to two-times the diameter of the blank 3. Therefore, the unobstructed or impeded, i.e. "free" or "clear" cross section of the muffle available for a gas flow is extremely small.

Figure 4:
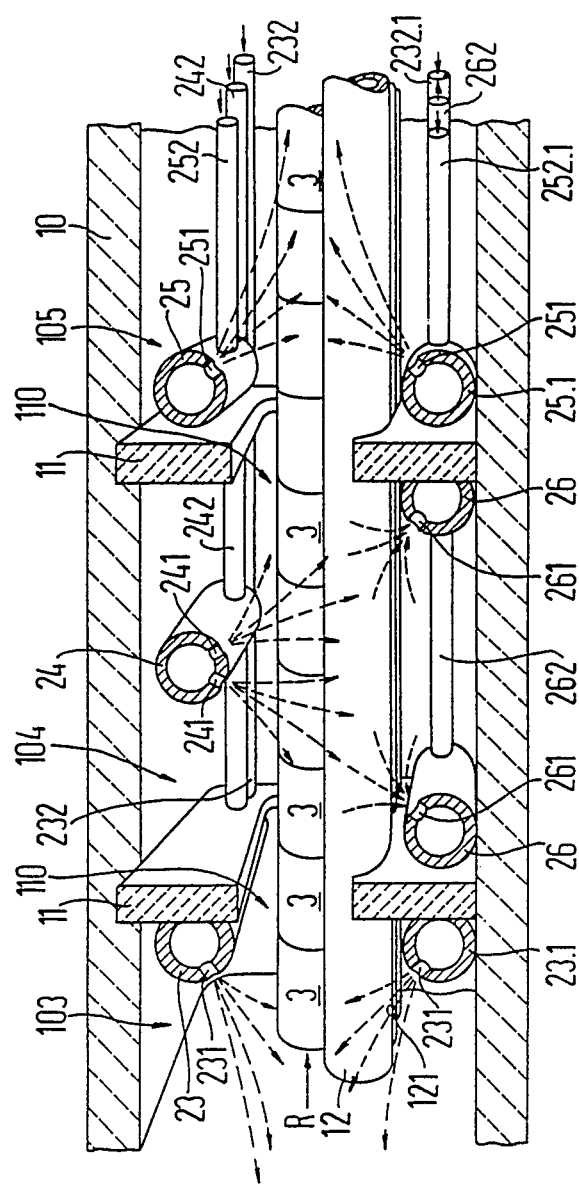
FIG. 4 is a perspective longitudinal section through the gas lock in an enlarged view.
Figure 5:
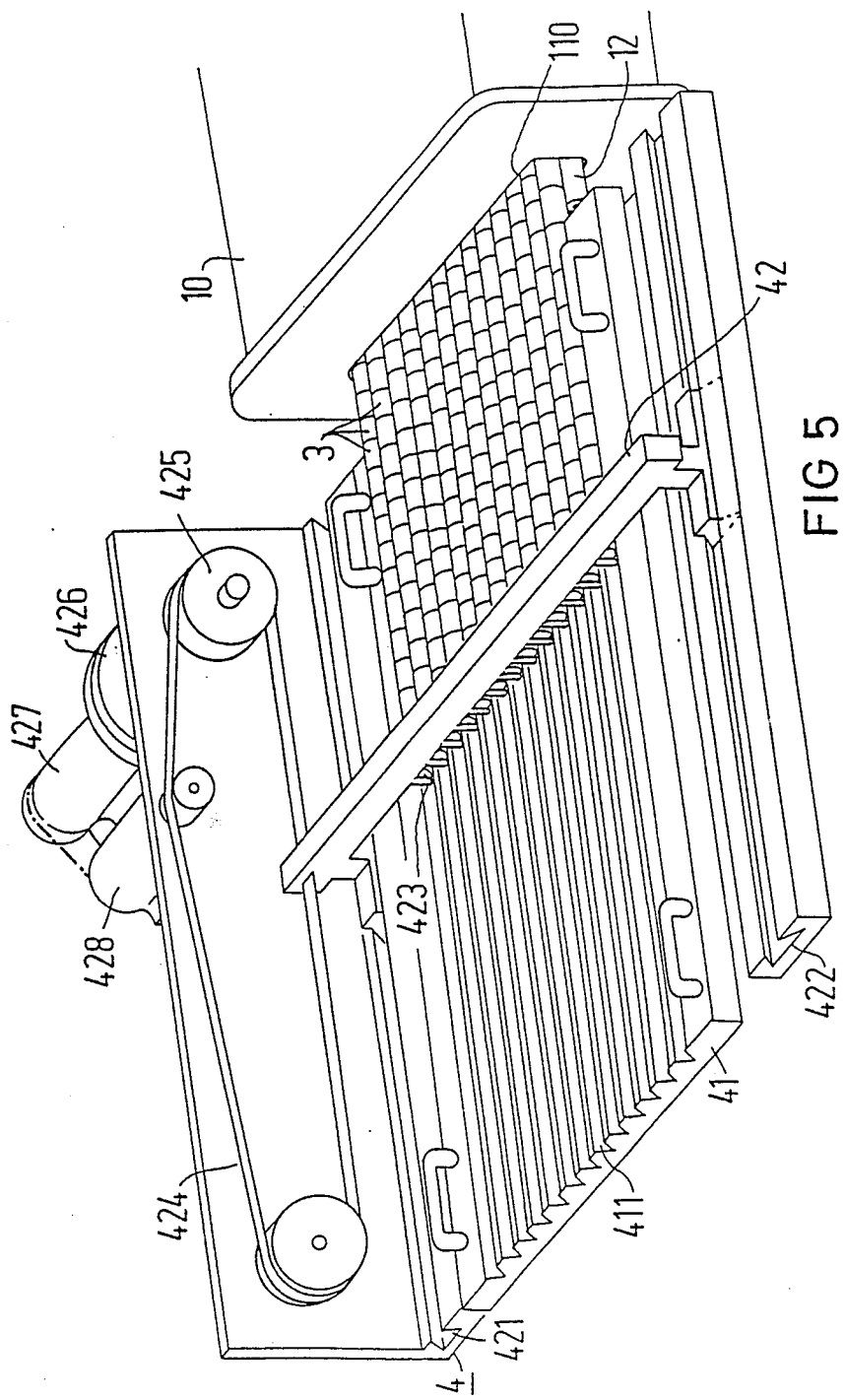
FIG. 5 is a perspective view of a charging device.

A gas lock 2, shown enlarged in FIG. 4, is disposed in the muffle 10 and divides the muffle into a sintering zone 103 and a reducing zone 105. To this end it has two partitions 11 which are placed a short distance from each other and enclose between them a decoupling zone 104, through which a flushing gas, for instance, nitrogen, flows from the top down. For this purpose, a distributor tube 24 with injection openings 241 is arranged transversely to the muffle axis in its upper region and connected to a feed tube 242. Two exhaust gas collectors disposed transversely to the muffle are arranged with exhaust gas openings 261 under the support tubes 12, and connected to an exhaust tube 262. The flushing gas injected into the decoupling zone 104 through the distributor tube 24 is thus discharged into the exhaust gas collectors 26, as indicated by the flow arrows. In the process, gas which may enter from the reducing zone 105 or from the oxidation zone 103 in the decoupling zone 104 is discharged along with the gas from zone 104, thereby effectively decoupling the sintering and the reducing zones. At least some of the hollow support tubes 12 may have a passage opening 121 for feeding in or exhausting gas. The passage opening in the individual support tubes are spaced different distances from the input opening of the muffle.

On the outside of the partition 11 of the gas lock facing the entrance openings 101 of the muffle 10, distributor tubes 23, 23.1 with injection openings 231 are arranged above and below the support tubes 12 which are connected to feed tubes 232,232.1, via which latter an oxidizing gas, for instance, $CO_2$ is fed-in. This gas is injected into the muffle through the injection openings 231 at an angle toward the input opening 101 of the muffle and exhausted via the terminating section 112. The gas therefore flows against the feeding direction R of the blanks through the passage openings 110 of the partitions 11, preventing undesired air components from advancing through the input opening 101 to the sintering zone proper ahead of the gas lock 2. Optionally, many partitions can be arranged in the muffle at smaller spacings from each other.

Distributor tubes 25 and 25.1 with injection openings 251 are arranged above and below the support tubes 12 on the side of the partition 11 of the gas lock 2, facing the exit opening 102 of the muffle. Distributor tubes 25 and 25.1 are connected to feed tubes 252 and 252.1, through which a gas mixture with reducing action is fed, for instance, 20% hydrogen and 80% nitrogen. This gas is injected, as shown by the flow arrows, toward the exit opening 102 into the muffle and exhausted via the terminating section 113.

The feed tubes for the various gases and the exhaust tube 262 are held in the partitions 11 and brought within the muffle up to the terminating section 113. In this manner, the gases are heated while being fed-in in the muffle 10.

The two partitions 11 of the gas lock are connected to each other mechanically by feed and exhaust tubes and are arranged movably in the muffle 10. The position of the gas lock 2 within the muffle and thereby, the ratio of the lengths of the sintering zone 103 to the reduction zone 105 can be changed simply in this manner and can be adapted to the respective process parameters.

The foregoing is a description corresponding, in substance to German application P No. 33 10 789.0, dated Mar. 24, 1983, international priority of which is being claimed for the instant application and which is hereby made part of this application. Any material discrepancies between the foregoing specification and the specification of the aforementioned corresponding German application are to be resolved in favor of the latter.

LIST OF REFERENCE SYMBOLS

1: Tunnel furnace
10: Muffle
101: Input opening
102: Exit opening
103: Sintering zone
104: Decoupling zone
105: Reduction zone
11, 11.1, 11.2: Partitions
110: Passage opening
111: Edge
112, 113: Terminating section
12: Guiding device, support rod, support tube
121: Passage opening
2: Gas lock
23, 23.1: Distributor tubes
24: Distributor tube
25, 25.1: Distributor tubes
26: Gas collector
231: Injection openings
241: Injection openings
251: Injection openings
261: Exhaust openings
231, 231.1: Feed tubes
242: Feed tube
252, 252.1: Feed tubes
262: Exhaust tube
3: Blank
4: Charging device
41: Plate
411: Grooves
42: Pushing rake
421: Slot
422: Slot
423: Tooth
424: Drive chain
425: Cogwheel
426: Coupling
427: Gear
428: Electric motor There is claimed:

1. Tunnel furnace, comprising a muffle with input and exit openings for sintering oxidic fuel blanks into oxidic nuclear fuel pellets; a guiding device passing through the muffle and protruding at least from the input opening for pushing the blanks in the form of a single layer column of abutting blanks through the muffle; two partitions each having one passage opening formed therein and each being disposed in said muffle at a distance from each other; said guiding device including prismatic support rods disposed mutually parallel and side by side at a lower edge of the passage openings in said partitions, said guiding device passing through said muffle having n+1 prismatic support rods for n columns of blanks; the passage openings being dimensioned so that the smallest distance between a blank supported between two support rods and adjacent edges of the passage opening is smaller than one to two-times the diameter of the blank, said muffle having a section in which an oxidizing atmosphere is maintained constituting a sintering zone; another section of said muffle in which a reducing atmosphere is maintained constituting a reduction zone; and a gas lock disposed between the sintering zone and the reduction zone, said gas lock having said two partitions enclosing between them a decoupling zone, through which a flushing gas flows transversely to the longitudinal axis of said muffle; one of said partitions facing the input opening of said muffle having an outside, first distributor tubes disposed at the outside of said partition facing the input opening of said muffle for feeding an oxidizing gas into the oxidizing atmosphere, said first distributor tubes having injection openings for injecting the oxidizing gas toward the input opening to said muffle; another of said partitions facing the exit opening of said muffle having an outside, and second distributor tubes disposed at the outside of said partition facing the exit opening of said muffle for feeding a reducing gas into the reducing atmosphere, said second distributor tubes having injection openings for injecting the reducing gas toward the exit opening of the muffle.

2. Tunnel furnace according to claim 1, wherein the distributor tubes are connected to feed tubes for the gases, which run inside the muffle and are held by the partition.

3. Tunnel furnace according to claim 1, wherein the gas lock is arranged movably in the muffle.

4. Tunnel furnace according to claim 1, wherein at least part of the support rods are hollow support tubes.

5. Tunnel furnace according to claim 4, wherein a temperature sensor is movably arranged in one of the hollow support tubes.

6. Tunnel furnace according to claim 4, wherein at least part of the hollow support tubes have a passage opening for the flow of gas therethrough.

7. Tunnel furnace according to claim 6, wherein the passage opening in the individual support tubes are spaced different distances from the input opening of the muffle.

* * * * *